No. 738,267. PATENTED SEPT. 8, 1903.
E. E. WEMP.
SEPARATING ROLLS FOR BEAN PICKING MACHINES.
APPLICATION FILED FEB. 9, 1903.
NO MODEL.
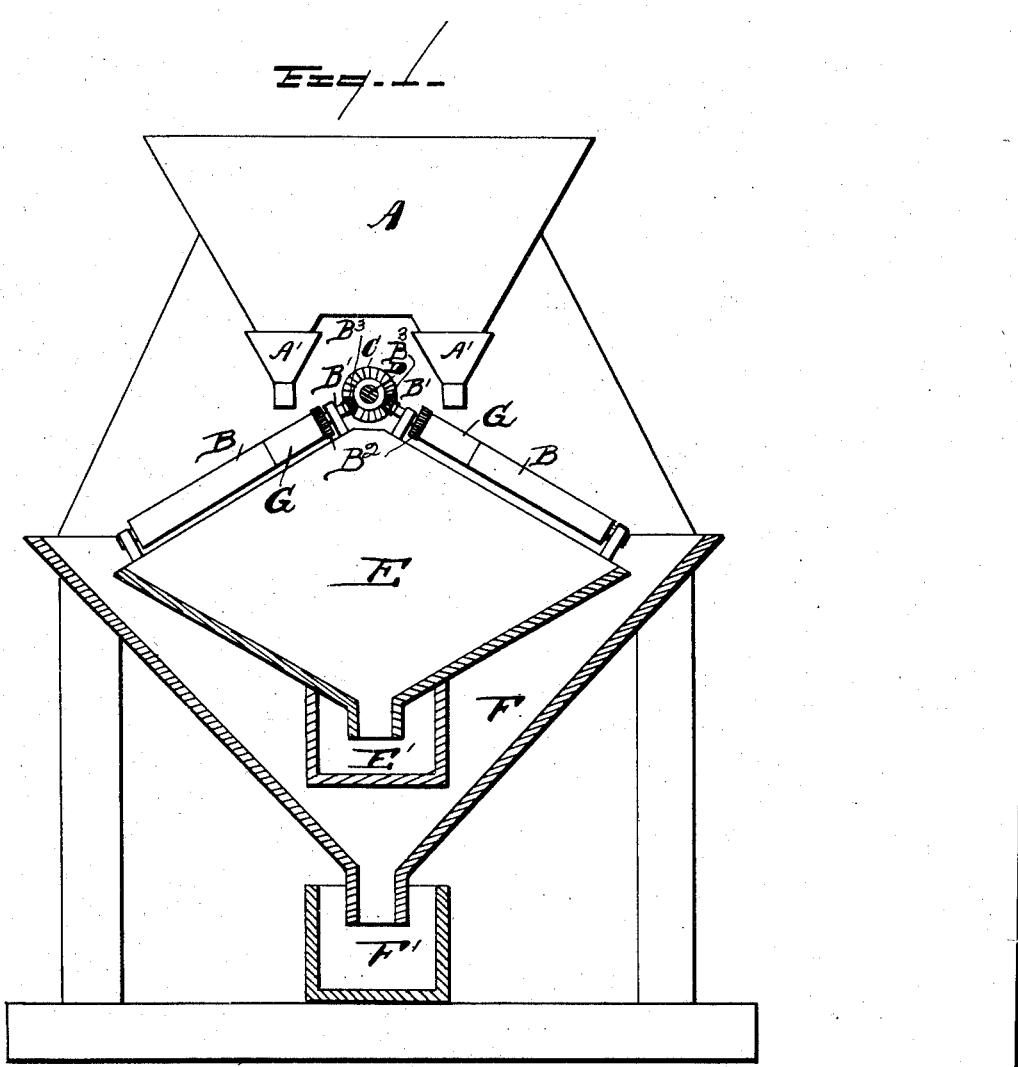
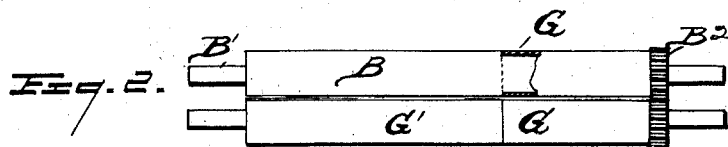
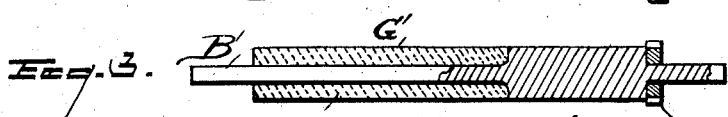
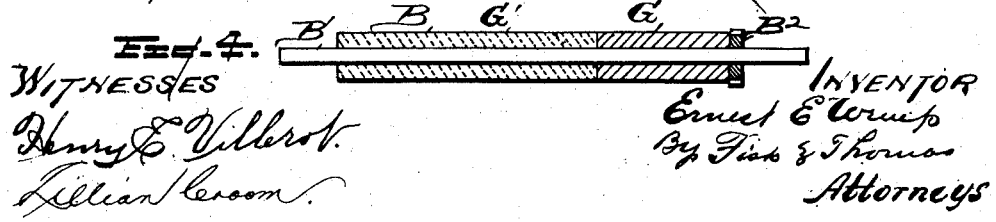

No. 738,267.

Patented September 8, 1903.

UNITED STATES PATENT OFFICE.

ERNEST E. WEMP, OF OXFORD, MICHIGAN.

SEPARATING-ROLL FOR BEAN-PICKING MACHINES.

SPECIFICATION forming part of Letters Patent No. 738,267, dated September 8, 1903.

Application filed February 9, 1903. Serial No. 142,533. (No model.)

*To all whom it may concern:*

Be it known that I, ERNEST E. WEMP, a citizen of the United States, residing at Oxford, county of Oakland, State of Michigan, have invented a certain new and useful Improvement in Separating-Rolls for Bean-Picking Machines; and I declare the following to be a full, clear, and exact description of the same, such as will enable others skilled in the art to which it pertains to make and use the same, reference being had to the accompanying drawings, which form a part of this specification.

My invention relates more particularly to an improvement in separating-rolls employed in bean-picking machines, shown in the accompanying drawings and set forth in the following specification and claims.

In the drawings, Figure 1 is an end elevation, partly in section, of a bean-picking machine. Fig. 2 is a view, partly in section, showing my improvement attached to the separating-rolls. Figs. 3 and 4 show variations.

This invention is designed for use in machines employing yielding rolls formed of rubber or other suitable material in which the beans are fed from a hopper between pairs of rubber revolving rolls, preferably placed on an angle. The beans as they drop from the hopper strike between the surfaces of the adjacent rolls and if they are smooth will slide down the inclined rolls into a hopper provided to receive them. If, on the other hand, the beans are imperfect or are what is known as "culls," the rolls will seize them and they will be fed through, depositing them in a separate receptacle provided for that purpose. It has been found in practice that the beans dropping from the hopper on the separating-rolls soon cause the rolls to wear rapidly at the point of contact, the constant dropping of the beans wearing a groove in the rolls, making it necessary to discard them for a new pair in order to avoid the passage of perfect beans with the culls.

The object of my invention is to provide a sleeve or unyielding surface at the point of impact or where the bean first comes in contact with the roll after leaving the hopper, as I have found in practice that the greatest wear occurs at this point.

Referring to the letters of reference shown in the drawings, A is the main hopper, from which the beans are delivered into the hoppers A', and from these they drop onto the separating-rolls B, mounted on the shafts B'.

B² represents spur-gears meshing with the gears on the adjacent roll, and B³ B³ are bevel-gears meshing with the bevel-gear C, mounted on the drive-shaft D.

E is a hopper designed to receive the culls and deliver the same into the receptacle E', and F is a hopper designed to receive the perfect beans and deliver them into the receptacle F'.

G is a protecting-sleeve of metal or other unyielding material mounted on the upper end of the separating-rolls B. This sleeve is slipped over the rubber or yielding portion G' to receive the impact of the beans as they drop from the hoppers A'. Being of an unyielding nature at this point, the rolls can be placed farther apart and still secure perfect separation. As the beans slide from the point of impact onto the yielding surface of the revolving rolls they will be engaged by the rolls if rough or imperfect and drawn through them and delivered into the hopper E, discharging into the cull-receptacle E'. If, on the other hand, they are sound, they will slide the length of the roll and be discharged into the hopper F, delivering into the receptacle for perfect beans. By the use of my invention the protecting-sleeves G may be applied after the rubber rolls show signs of wear, or, if desired, the roll may be made of metal at the point of impact of a diameter equal to that of the rubber roll at the opposite end, as shown in Fig. 3. I prefer, however, the sleeve form, as by its use if the rubber roll shows signs of wear adjacent to the abutting end of the sleeve it can be slid down to cover the worn portion, and thus extend the life of the roll.

In Fig. 4 I show a variation, in which the sleeve is keyed to the shaft, and when the rubber roll shows wear adjacent to the edge of the sleeve that portion can be cut away and the sleeve moved into abutting contact with the roll.

Having thus described my invention, what I claim is—

1. In a bean-picking machine, a pair of inclined flexible separating-rolls provided with an unyielding section at their upper ends to receive the impact of the bean and guide the same onto the yielding surface, substantially as described.

2. In an inclined flexible separating-roll for bean-picking machines, an unyielding sleeve at one end of the roll to receive the impact of the dropping bean prior to the passage of the same along the yielding surface of the roll, substantially as described.

In testimony whereof I sign this specification in the presence of two witnesses.

ERNEST E. WEMP.

Witnesses:
CHARLES O. WHITCOMB,
A. R. BELLAIRE.